Patented Jan. 18, 1944

2,339,247

UNITED STATES PATENT OFFICE 2,339,247

CATALYTIC CONVERSION OF HYDRO-CARBONS

Joseph D. Danforth, Chicago, Ill., assignor to Universal Oil Products Company, Chicago, Ill., a corporation of Delaware No Drawing. Application January 8, 1940, Serial No. 312,845

3 Claims. (Cl. 196—52)

The present invention relates particularly to a process for the conversion of hydrocarbons such as petroleum fractions and hydrocarbonaceous matter generally including synthetic oil from numerous carbon-containing sources in the presence of catalysts to produce substantial yields of lower boiling fractions within the gasoline boiling range having high antiknock value. The process is applicable to conversion involving single hydrocarbons, synthetically produced hydrocarbon mixtures, or primary distillates produced in the destructive distillation of hydrocarbon-containing material such as coals, lignites and shales. Although practically the whole range of hydrocarbons may generally be processed, more frequently the hydrocarbon fractions charged to the process are of a distillate character and vaporizable without substantial decomposition.

In general the invention is concerned with the modification of hydrocarbon conversion processes involving the use of specific catalysts which selectively promote the hydrocarbon reactions involved in the formation of high antiknock gasoline. The art of cracking relatively heavy hydrocarbons to produce primarily gasoline and/or gas is very extensive and it is recognized that most of the basic principles of hydrocarbon decomposition by thermal treatment are known and that particular commercial processes have been developed which embody these principles. The application of catalysts in cracking reactions is practically on the same basis as it is in other fields, that is, knowledge relative to the hydrocarbon reactions involved is scant and definite information concerning the relative value of different catalysts and their mode of preparation is very meager. A large number of catalysts have a tendency to accelerate reactions leading to the formation of gas rather than of gasoline, such as dehydrogenation reactions where the carbon to hydrogen bonds are severed. Others involve reactions where the cleavage of carbon to carbon bonds is the predominant effect. Some catalysts are extremely sensitive to sulfur poisoning, or they may be very rapidly coated with carbonaceous materials so as to become practically inert and unsusceptible to regeneration treatment. The deterioration of the catalyst depends not only upon the types of hydrocarbon reactions accelerated but also upon the catalyst composition and its method of preparation. In general, it may be said that very few, if any, catalysts which have been tried thus far in cracking reactions have proved entirely satisfactory in commercial practice. The present invention is concerned with the use of catalytic materials, which are especially suitable in accelerating the cracking of heavy fractions of petroleum and other hydrocarbonaceous materials, to increase the rate of production of gasoline boiling range fractions of high antiknock value.

In one specific embodiment the present invention comprises subjecting hydrocarbon oil vapors at elevated temperature and relatively low superatmospheric pressure, to contact with particles of a synthetically prepared composite mass consisting of hydrated silica, hydrated alumina and/or hydrated zirconia to which boric oxide has also been added to produce relatively large yields of high antiknock gasoline.

According to the present invention, hydrocarbon fractions, for example, a petroleum gas oil or a hydrocarbon fraction of low antiknock value boiling substantially within the gasoline boiling range, may be processed by contacting with silica-alumina and/or zirconia catalyst containing boric oxide in the temperature range of ordinary thermal cracking but at pressures substantially lower than those required in the noncatalytic process. In the catalytic cracking, the gasoline has an octane number of approximately 80 which is at least 8 to 10 octane numbers higher than is obtained in the usual pyrolytic cracking process.

The catalysts of the present invention may be prepared by a number of alternative methods which will be subsequently described. Generally speaking, however, the catalyst may be considered to comprise an intimate molecular mixture of silica-alumina and/or zirconia with boric oxide, each component indicating more or less low activity individually but in the aggregate displaying high activity. The activity is not an additive function and no one component is considered as the support or carrier while the remaining components constitute the active principles. The components of the catalyst are referred to as the compounds obtained in the chemical analysis of the completed preparation, but no definite knowledge is available as to the specific nature of the catalytic surfaces or the manner of chemical combination of the metal compounds comprising the active catalyst. Aside from the catalytic activity displayed by the zirconium component, a stabilizing effect is definitely associated with its use in the catalyst whereby the active surfaces essentially retain their activity for long periods of time. The addition of the boric oxide component imparts additional activity to the catalyst over and above that obtained when using the catalyst without added boric oxide.

According to one general method of preparation the preferred catalyst may be prepared by precipitating silica from a solution as a gel and subsequently admixing or depositing the hydrated alumina and/or hydrated zirconia on the hydrated silica. The boric oxide component may then be admixed with the silica-alumina and/or zirconia. One of the more convenient methods of preparing the silica gel is to acidify an aqueous solution of sodium silicate by the addition of an acid such as hydrochloric acid for example. The manner in which precipitation is brought about, the alkalinity used in substantially completing the precipitation and the excess of acid subsequently added are carefully regulated in order that a suitable silica hydrogel is formed for compositing with the remaining components.

In preparing the catalyst, it is treated and washed to substantially remove alkali metal impurities either before or after drying treatment. It is not known in exactly what form the alkali metal impurities exist in the gel or dried material but it has been definitely determined that the removal of these impurities is necessary if catalysts suitable for prolonged use in accelerating hydrocarbon conversion reactions are to be obtained. It is possible that the presence of the alkali metal impurities causes a sintering or fusion of the surfaces of the catalysts at elevated temperatures so that the porosity is much reduced with corresponding reduction in effective surface. Alkali metal impurities may be removed by treating with solutions of acidic materials, ammonium salts generally or salts of multivalent metals more generally those of aluminum and zirconium. When treating with acids, as for example, dilute hydrochloric acid, the acid extracts the alkali metal impurities, and the salts formed and excess acid are substantially removed by the washing treatment. Where ammonium salts or salts of multivalent metals are used, the ammonium or multivalent metals used apparently displace the alkali metal impurities present in the composite, and the alkali metal salts formed together with the major portion of the multivalent salts present are removed in the subsequent washing treatment. The relatively small amount of multivalent metal introduced into the silica hydrogel in the purifying treatment may become a permanent part of the deposit whereas in the treatment with ammonium salts the small amount of the ammonium salt remaining after the washing process may be driven off in subsequent treatment at elevated temperatures.

In general, the hydrated silica gel may be mixed while in the wet condition with separately prepared hydrated alumina and hydrated zirconia either separately or concurrently precipitated, or the hydrated alumina and hydrated zirconia may be precipitated in the presence of hydrated silica or co-precipitated therewith. The precipitated silica gel, with or without purification to remove alkali metal compounds may be admixed with the hydrated alumina and hydrated zirconia in any convenient manner, these components being deposited under conditions whereby alkali metal impurities are excluded when the silica gel has been preliminarily purified before compositing with these components. In other alternative but not equivalent methods which may be employed, the silica gel may be added to a solution of salts of aluminum and zirconium, and hydrated alumina and hydrated zirconia deposited by hydrolysis with or without the use of heat; or the silica gel may be mixed with suitable amounts of salts of aluminum and zirconium as for example in forming a paste and heating whereby alumina and zirconia are deposited upon the silica gel as a result of the decomposition of the aluminum and zirconium salts.

In compositing the precipitated hydrated silica gel with the aluminum and/or zirconium components, this may be carried out by adding zirconium and aluminum salts to the silica gel in suspension using zirconium and aluminum salts in the desired proportions and depositing hydrated alumina and/or hydrated zirconia upon the suspended silica by the addition of a volatile basic precipitant such as ammonium hydroxide for example, or ammonium carbonate, ammonium hydrosulfide, ammonium sulfide or other volatile basic precipitants such as organic bases may be employed. According to this method silica gel might be suspended in the solution of zirconium and/or aluminum chloride for example and the hydrated zirconia and/or hydrated alumina precipitated by the addition of ammonium hydroxide. In this example, the alumina and zirconia would be coprecipitated when both components are used. Good results may be obtained, however, by depositing one of these components prior to the remaining component.

Where the silica-alumina and/or zirconia are coprecipitated, solutions of silicon compounds, more usually, alkali metal silicate and soluble aluminum and zirconium salts may be mixed under regulated conditions of acidity or basicity to jointly precipitate hydrated silica, hydrated aluminum and zirconium salts may be mixed un proportions. For example, solutions of sodium silicate, aluminum chloride and zirconyl chloride may be mixed, and alkaline or acid reagents added according to the proportions of the catalyst components to be precipitated so that the optimum precipitation conditions are obtained. Whatsoever the specific method used, in general the catalytic material is prepared by precipitating hydrated silica separately or in combination with the alumina and/or zirconia components, and the purification treatment to remove alkali metal impurities, where present in substantial amounts is applied either to the silica gel before compositing with the remaining components or subsequent to compositing, preferably after drying treatment. When purifying the composited catalytic material after drying, the catalyst grains are washed with the purifying agent until no further reaction occurs, and the material is practically free from alkali-metal impurities.

The character and efficiency of the ultimately prepared silica-boric oxide-alumina and/or zirconia catalyst will vary more or less with precipitation and/or mixing conditions, purification treatment, ratio of components, calcining, etc., several specific examples being given below. The ratio of the components may be varied within wide limits. In general, it appears that two to six mol per cent of alumina and/or zirconia together or separately with reference to silica may be considered an approximation of the minimum proportions to be used. In most cases large proportions of zirconia are not necessary to produce the desired stabilizing effects and it has been observed in some cases that as the amount of zirconia is increased in the catalyst composite, dehydrogenating reactions are increased so that the gases evolved contain large percentages of hydrogen. The amount of boric oxide which is added may generally vary from approximately 5 to 20 per cent by weight of the composited catalyst, higher percentages up to 50 per cent, however, having been used in some cases with increased yields of high antiknock gasoline.

The boric oxide component according to one mode of preparation may be added to the silica-alumina and/or zirconia composite after drying. The hydrated silica, hydrated alumina and/or zirconia which has been purified to remove alkali-metal impurities, according to the various procedures described above, is dried at a temperature of the order of 240–300° F. This material is intimately admixed while in the powdered condition with finely divided boric oxide and the mixture is then usually formed into particles of a suitable size by compression methods such as pilling, briquetting or consolidating into aggregates and reduction to the desired average particle size. Subsequently the material is heated at high temperatures whereby the catalyst assumes the active form necessary for prolonged use in the treatment of hydrocarbons. Temperatures that have been used are of the order of 950–1000° F., more or less, and the time of treatment may be one or several hours.

The invention is not limited as to the manner in which the boric oxide is deposited upon the alkali-metal-free composites of precipitated hydrous oxides. Any suitable method may be employed where the boric oxide is intimately distributed in and on preferably the purified silica gel or silica-gel composite. Many variations in procedure are possible, the boric oxide being deposited concurrently with other compounds or subsequent thereto, and before and after drying.

The catalyst of the present invention may be conveniently utilized in carrying out the desired reactions when employed as filling material in tubes or chambers in the form of small pellets or granules. The average particle size may vary within the approximate range of 2 to 10 mesh more or less which may apply either to pellets of uniform size, short cylindrical shapes, or to particles of irregular shape produced as for example by consolidating and sizing the powdered catalytic material. While the simple method of preheating a given fraction of hydrocarbon oil to be processed at a temperature suitable for conversion in contact with the catalyst, and then passing the vapors over a stationary mass of the catalyst particles may be employed in some cases, it is generally preferably to pass the preheated vapors through the catalysts where the passage of vapors is restricted to definite paths rather than allowing the vapors to have unrestricted contact with large beds of catalytic material. It is thus possible to control more accurately the temperature of the contact materials both in use and during regeneration by various heat interchange devices and media. After the passage of oil vapors over the catalyst, the products may be separated into fractions unsuitable for further cracking, intermediate insufficiently converted fractions suitable for further catalytic cracking treatment, a gasoline boiling range fraction, and gases. The intermediate fractions may be returned directly to admixture with the charging stock or processed in separate passes so as to obtain ultimately the maximum utilization of the charging stock in producing the gasoline product. Although the above consists in a more conventional practice, it is also possible to suspend the catalyst in a stream of oil as a powder and treat the suspension under suitable conditions of temperature, pressure and contact time. The normally gaseous fraction separated from the gasoline product when using higher temperatures contains much larger proportions of readily polymerizable olefins, more particularly propene and butenes, than are usually experienced in ordinary thermal cracking, and these may be readily polymerized using thermal and/or catalytic treatment to produce additional yields of gasoline to be blended, if desired, with the major gasoline product produced in the process. A number of polymerizing catalysts are generally known, particularly phosphoric acid deposited in siliceous adsorbent and this and/or other polymerizing catalysts may be used to polymerize the above mentioned olefins.

The application of the present invention to conversion of hydrocarbon fractions besides being characterized by the use of novel catalysts is also of importance because of the moderate operating conditions of temperature and pressure. Temperatures employed in contact with the catalysts may be within the range of 750–1250° F. Substantially atmospheric pressure or moderately superatmospheric pressure up to several hundred pounds per square inch, more or less, may be used. The pressures are somewhat governed by the flow conditions through the vaporizing and conversion zones and the subsequent separating, fractionating and collecting equipment but are usually below 100 pounds per square inch.

The following specific examples are given to illustrate the process of the invention, the methods of catalyst preparation also being given. The process should not be considered as limited to these examples of the process or to the particular catalyst preparation, these being given as illustrative of the novelty and utility of the invention.

*Example I*

A catalyst having the molar composition $100SiO_2 : 10Al_2O_3 : 11B_2O_3$ was prepared according to the present invention as follows. A commercial water-glass grade of sodium silicate containing approximately 28.5% silicon dioxide and 9% by weight of sodium oxide was diluted with approximately 10 volumes of water. Hydrochloric acid was gradually added while agitating until the mixture was barely alkaline to phenolphthalein. The silica gel which formed was well broken up and a small additional amount of hydrochloric acid was added until the mixture was just acid to Congo red whereby substantially complete precipitation of the silica gel was effected. The silica gel suspension was then brought back practically to a neutral point when tested with litmus and charged to a filter. The material on the filter was washed with dilute aluminum chloride solution until the filtrate no longer gave a test for sodium with magnesium uranyl acetate reagent. The cake on the filter was then removed, broken up and slurried in a solution of aluminum chloride. The aluminum chloride present in the solution was in an amount sufficient to give the desired final alumina composition above noted. Ammonium hydroxide was then added to the slurry until the mixture was still just barely acid to litmus whereupon the hydrated alumina was substantially completely precipitated upon the suspended silica gel. The suspension was then directed to a filter and the filter cake therefrom was removed and dried to a water content of approximately 20%. The dried mixture was then ground to pass a 30 mesh screen whereupon it was thoroughly admixed with 9.1% by weight of the total mass of boric oxide powder. The mixture was formed into 6–10 mesh granules and calcined at a temperature of approximately 950° F. for one hour.

The catalyst granules above described were disposed in a vertical reaction chamber and vapors of a Pennsylvania gas oil preheated to a temperature of approximately 932° F. was contacted therewith while maintaining said temperature for a two-hour period before regenerating using a liquid space velocity of 8. As a result of the above treatment 26.3 volume per cent of gasoline was obtained having an octane number of approximately 80, the gasoline to gas weight ratio being 2.2. When processing a similar amount of catalyst particles prepared from the same silica-alumina material containing no added boric oxide, only 13.3 volume per cent of gasoline was formed under the same conditions.

Example II

A blend of silica, alumina and zirconia was prepared similarly as described in Example I for silica and alumina having the following composition: $100SiO_2.2Al_2O_3.5ZrO_2$. Portions of the dried composite powdered to pass 30 mesh screen were admixed with 5 and 10% boric oxide, and a small amount of a graphite lubricant and was then pilled. Comparative tests were made on pilled samples containing no boric oxide and those containing 5 and 10% boric oxide by preheating a paraffin distillate obtained from a Mid-Continent crude oil to a temperature of 932° F. and contacting with these catalysts maintained substantially at this temperature in a reaction vessel. A space velocity of 4 was used and 6 cycles each of one hour on stream and one hour on regeneration. The results were as follows:

|  | Per cent $B_2O_3$ in catalyst | | |
| --- | --- | --- | --- |
|  | 0 | 5 | 10 |
| Gasoline ................ volume per cent.. | 20.8 | 23.1 | 23.0 |
| Gasoline ................ octane number.. | 78 | 78 | 78 |
| Gas .................... weight per cent.. | 5.3 | 5.4 | 4.5 |
| Hydrogen in gas ........ volume per cent.. | 43.5 | 39.2 | 34.0 |
| $C_3$ and $C_4$ olefins in gas .......... do.... | 3.0 | 3.0 | 2.5 |

It will be noted in the above tests that a substantial increase of gasoline was obtained with the catalyst containing boric oxide and that there was a definite decrease in the amount of hydrogen produced during reaction with increased boric oxide content of the catalyst.

I claim as my invention:

1. A conversion process which comprises contacting hydrocarbon oil at cracking temperature with a catalyst comprising a major proportion of silica and minor proportions of zirconia and boric oxide.

2. The process of claim 1 further characterized in that the catalyst contains alumina.

3. A conversion process which comprises contacting hydrocarbon oil at cracking temperature with a catalyst comprising silica, zirconia and boric oxide.

JOSEPH D. DANFORTH.